(12) United States Patent
Jun

(10) Patent No.: US 7,406,655 B2
(45) Date of Patent: *Jul. 29, 2008

(54) METHOD OF DESCRIBING MULTIPLE LEVEL DIGEST SEGMENT INFORMATION SCHEME FOR MULTIMEDIA CONTENTS AND APPARATUS FOR GENERATING DIGEST STREAM FROM DESCRIBED MULTIPLE LEVEL DIGEST SEGMENT INFORMATION SCHEME AND METHOD THEREOF

(75) Inventor: Sung-Bae Jun, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/018,319

(22) Filed: Dec. 22, 2004

(65) Prior Publication Data
US 2005/0108622 A1 May 19, 2005

Related U.S. Application Data

(63) Continuation of application No. 09/493,603, filed on Jan. 28, 2000, now Pat. No. 6,918,081.

(30) Foreign Application Priority Data
Jan. 30, 1999 (KR) .................................. 1999-3015

(51) Int. Cl.
*G06F 17/24* (2006.01)
*G06F 13/00* (2006.01)
*G06F 17/00* (2006.01)

(52) U.S. Cl. ........................ 715/201; 715/716; 715/802; 725/41; 725/45; 707/100

(58) Field of Classification Search .............. 715/500.1, 715/501.1, 716, 802; 707/3, 100, 101, 104, 707/102
See application file for complete search history.

(56) References Cited

U.S. PATENT DOCUMENTS 4,912,571 A     3/1990   Sekiya ........................ 386/77

(Continued)

FOREIGN PATENT DOCUMENTS

EP           0528642 A2    2/1993

(Continued)

OTHER PUBLICATIONS

Lienhart et al, "Video Abstract", Communications of ACM, pp. 1-12, Dec. 1997.*

(Continued)

*Primary Examiner*—William Bashore
*Assistant Examiner*—MaiKhanh Nguyen
(74) *Attorney, Agent, or Firm*—Sidley Austin LLP

(57) ABSTRACT

The present invention is intended to provide multiple levels of digest streams for multimedia contents with small amount of additional storage using a multiple level digest segment information scheme. In the present invention, a multiple level digest segment information is contained in the content-based data area of the multimedia content by representing a level information of each digest segment by multiple levels in a content-based data area of a multimedia content, describing the digest level of the digest segment and the time range information of the digest segment in the digest segment information scheme, and outputting digest segments whose digest level is less than or equal to requested digest level by decoding, upon receipt of the digest level of the digest segment.

18 Claims, 5 Drawing Sheets

U.S. PATENT DOCUMENTS

| | | | |
|---|---|---|---|
| 5,521,841 A | | 5/1996 | Arman et al. |
| 5,532,833 A | * | 7/1996 | Hong et al. ................... 386/77 |
| 5,572,728 A | * | 11/1996 | Tada et al. ................... 707/200 |
| 5,589,945 A | | 12/1996 | Abecassis |
| 5,614,940 A | | 3/1997 | Cobbley et al. |
| 5,752,029 A | | 5/1998 | Wissner |
| 5,821,945 A | * | 10/1998 | Yeo et al. ................... 345/440 |
| 5,828,809 A | | 10/1998 | Chang et al. |
| 5,918,223 A | * | 6/1999 | Blum et al. ................... 707/1 |
| 5,956,026 A | * | 9/1999 | Ratakonda ................... 715/723 |
| 5,956,729 A | * | 9/1999 | Goetz et al. ............... 707/104.1 |
| 5,995,095 A | * | 11/1999 | Ratakonda ............... 715/500.1 |
| 6,181,342 B1 | * | 1/2001 | Niblack ................... 345/635 |
| 6,223,183 B1 | | 4/2001 | Smith et al. ................... 707/102 |
| 6,225,993 B1 | | 5/2001 | Lindblad et al. ............ 715/716 |
| 6,263,507 B1 | * | 7/2001 | Ahmad et al. ............... 725/134 |
| 6,278,446 B1 | | 8/2001 | Liou et al. |
| 6,411,724 B1 | | 6/2002 | Vaithilingam et al. ....... 382/100 |
| 6,557,042 B1 | | 4/2003 | He et al. ................... 709/231 |
| 6,744,922 B1 | | 6/2004 | Walker |
| 6,961,954 B1 | * | 11/2005 | Maybury et al. .............. 725/53 |

FOREIGN PATENT DOCUMENTS

| | | | |
|---|---|---|---|
| EP | 0555028 A2 | | 8/1993 |
| EP | 0 597 450 B1 | | 5/1994 |
| EP | 0597450 A2 | | 5/1994 |
| EP | 0746162 A2 | | 4/1996 |
| EP | 0782139 A2 | | 7/1997 |
| JP | 03-090968 | | 4/1991 |
| JP | 03090968 | | 4/1991 |
| JP | 08-292965 | | 11/1996 |
| JP | 9045007 | | 2/1997 |
| JP | 9063252 | | 3/1997 |
| JP | 10-112835 | | 4/1998 |
| JP | 11-220689 | | 8/1999 |
| JP | 11-238071 | | 8/1999 |
| JP | 2001-160066 | | 6/2001 |
| WO | WO 98/27497 | * | 6/1998 |
| WO | WO 99/03275 A1 | | 1/1999 |
| WO | WO 99/28835 A2 | | 6/1999 |

OTHER PUBLICATIONS

DeMenthon et al., "Video Summarization by Curve Simplification", ACM Multimedia' 98, pp. 211-218.*

Yeo et al., "Retrieving and Visualizing Video", Communications of the ACM, Dec. 1997, vol. 40, No. 12, pp. 43-52.*

Pope et al., "Video Abstraction: Summarizing Video Content for Retrieval and Visualization", IEEE, Nov. 1998, vol. 1, pp. 915-919.*

N. Dimitrova et al., "Motion Recovery for Video Content," ACM Transactions on Information Systems, vol. 13, No. 4, Oct. 1995, pp. 408-439.*

B. Yeo et al., "Retrieving and Visualizing Video," Communications of the ACM, vol. 40, No. 12, Dec. 1997, pp. 43-52.*

Jonathan D. Courtney, "Automatic Video Indexing Via Object Motion Analysis," Jul. 1996, pp. 607-625.*

PCT International Search Report for International Application No. PCT/KR99/00850, Mar. 24, 2000, 2 pages.

Supplementary European Search Report for European Application No. EP99962551.0, Jun. 27, 2005, 5 pages.

K. Ratakonda et al., "Hierarchical Video Summarization," *Proceedings of the SPIE, Conference on Visual Communications and Image Processing 1999*, Jan. 25-27, 1999, San Jose, California, vol. 3653, 1531-1541 pages.

U.S. Appl. No. 60/117,695, filed Jan. 29, 1999, Smith.

Canadian Office Action dated Dec. 21, 2006, for related Canadian Application No. 2,323,890, 2 pages.

Haus et al., "Describing and Processing Multimedia Objects by Petri Nets," IEEE, 1997, pp. 3906-3911.

J. Nam et al. "Dynamic Video Summarization and Visualization," Proceedings of the seventh ACM international conference on Multimedia, ACM, 1999, pp. 53-56.

* cited by examiner

DIGEST SEGMENT

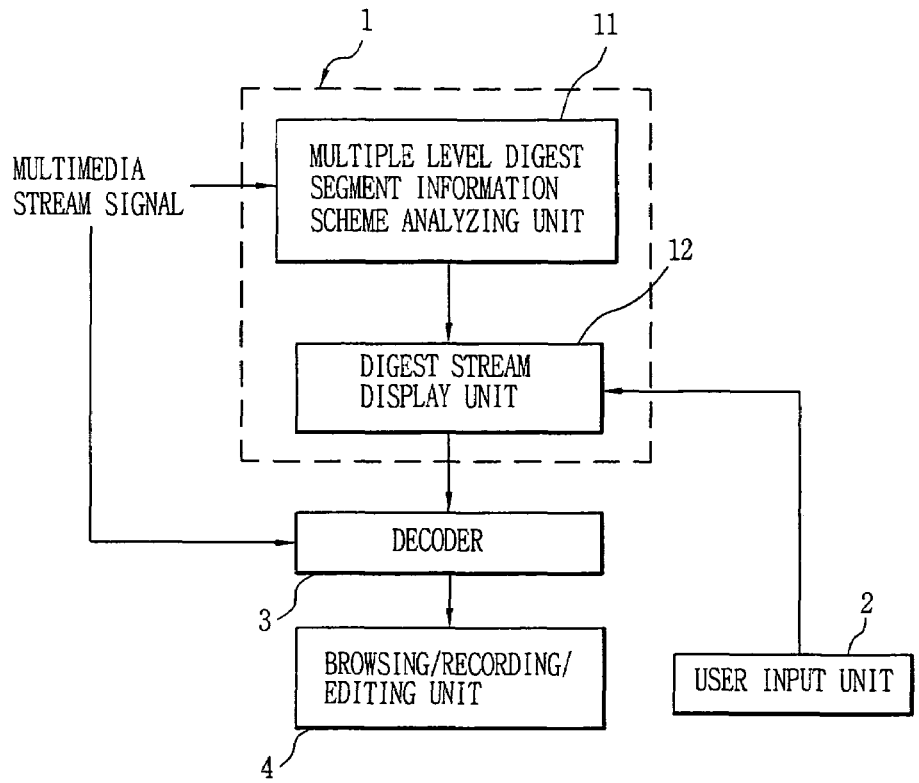
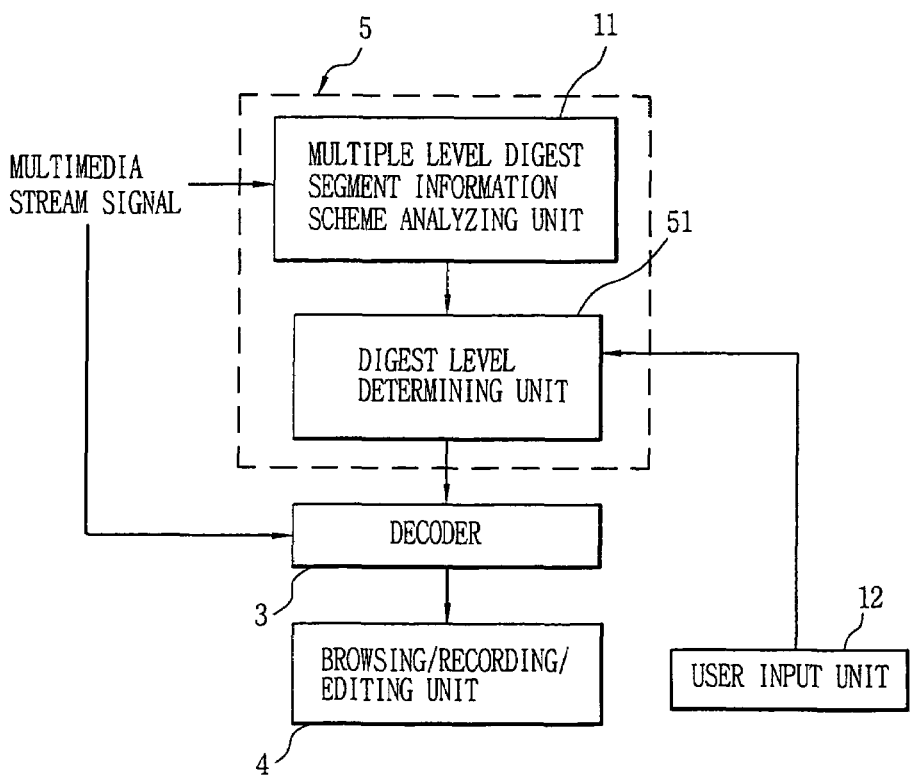

METHOD OF DESCRIBING MULTIPLE LEVEL DIGEST SEGMENT INFORMATION SCHEME FOR MULTIMEDIA CONTENTS AND APPARATUS FOR GENERATING DIGEST STREAM FROM DESCRIBED MULTIPLE LEVEL DIGEST SEGMENT INFORMATION SCHEME AND METHOD THEREOF

This application is a Continuation of prior application No. 09/493,603, filed Jan. 28, 2000 now U.S. Pat. No. 6,918,081, which is hereby incorporated by reference.

BACKGROUND OF THE INVENTION

1. Field of the Invention

The present invention relates to a technique for describing a multiple level digest segment information scheme for multimedia contents in a content-based data area of a multimedia stream and method for generating a digest streams(highlights) using the multiple level digest segment information scheme for the purpose of providing a multiple levels of digest streams for a multimedia stream.

2. Description of the Prior Art

A digest stream for a multimedia stream is provided for the purpose of enabling users to understand the overall story and the structure of a multimedia content or to find and move to desired position fast.

Multimedia server system such as a VOD(Video-on-Demand) server system, a broadcast system, a karaoke, etc., can provide digest streams(highlights) for multimedia contents (e.g., movie, drama, sports, etc.) to achieve above purposes.

A digest stream(highlight) of a multimedia stream is constructed by arranging audio-visual segments, each of which is the essence of an original stream in the development of the story. Here, the segment is a sequence of continuous frames. Since the digest stream is a sub stream of the multimedia stream, the size of the digest stream is much smaller than that of the original stream.

Therefore, a user who want to understand the overall structure and/or the story of a multimedia content prefers to access a digest stream rather than accessing the entire stream. The digest stream also can be used as a program guide for users who want to select a program from a multimedia database.

There are two types of summarization method for multimedia contents. The one is providing key frames or key regions and the other is providing digest streams(highlights) which is constructed by gathering and arranging important segments of an original stream In the former method, since it is difficult for a user to understand the entire flow of the original stream and it is difficult to display too many key frames at a time, an additional operation such as a screen scrolling is required in order to understand the content of the stream only with the key frames, thereby causing an inconvenience.

In the latter method, generally, a content provider extracts a sub stream from the original stream, and stores it separately. In this case, an additional storage for storing the digest stream is required. In addition, the content provider edits only a certain time amount of the digest stream and provides it to the user. Accordingly, the user can access only a single level digest stream edited by the content provider. Therefore, users cannot obtain various digest streams of the desired length. Suppose that a content provider provides only a 10 minute highlight for a 2 hour video. Under that situation, users may want to access 5, 10, 20 minute digest streams respectively, depending upon their situation. In that case, a user who want 5 or 20 minute highlight for the given content can not browse the digest stream of their desire. Only 10 minute digest stream will be served regardless of the user's request. Therefore, in order to satisfy user's various needs, the content provider has to edit and store multiple levels of digest streams for one multimedia stream. In this case, a large amount of storage is required to store multiple versions of digest streams, and accordingly there occurs difficulty in managing each of the digest stream.

SUMMARY OF THE INVENTION

Accordingly, it is an object of the present invention to provide a multiple levels digest streams, thereby dynamically coping with the level of user's need with respect to a digest stream.

It is another object of the present invention to provide multiple levels of digest streams with small amount of storage.

It is yet another object of the present invention to reduce the encoding time of a digest stream.

To achieve the above objects, there is provided a method of describing information about multiple levels of digest streams for multimedia contents in accordance with an embodiment of the present invention which includes the steps of: describing the level information of digest segments by multiple levels in the content-based data area of the multimedia content; describing the digest level information of each digest segment and the time range information in a digest segment information structure; and describing multi level digest segment information scheme with digest segment information structures.

To achieve the above objects, there is provided a method of describing information about multiple levels of digest streams for multimedia contents in accordance with the second embodiment of the present invention which includes the steps of: describing the digest level information of digest segments to a digest level header by multiple levels in the content-based data area of a multimedia stream; describing the time range information of each digest segment in a digest segment information structure; and describing information about digest streams by arranging the digest segment information structures of the same digest level describing multi level digest segment information scheme with digest level headers each of which has a list of digest segment information structures. In order to achieve the above objects, there is provided a method of generating multiple levels of digest streams for multimedia contents in accordance with the present invention which includes the steps of: detecting the digest level and time range information of each digest segment information structures from the multiple level digest information scheme contained in the content-based data area of a multimedia stream; and, when a condition is queried by the user, generating a multiple level digest stream by arranging the digest segments with a priority of more than a certain level corresponding to the condition in a time sequence.

In addition, to achieve the above objects, there is provided an apparatus for generating multiple levels of digest streams for multimedia contents in accordance with the present invention which includes an user input unit; a digest stream level determining unit for determining a digest level of a digest stream corresponding to the condition queried by the user input unit and outputting the same, upon receipt of a multimedia stream signal; and a decoder for decoding the digest segments having the above digest level and outputting the same.

Additional advantages, objects and features of the invention will become more apparent from the description which follows.

BRIEF DESCRIPTION OF THE INVENTION

The present invention will become more fully understood from the detailed description given herein below and the accompanying drawings which are given by way of illustration only, and thus are not limitative of the present invention, and wherein:

FIG. 6 is a schematic block diagram of an apparatus for generating multiple levels of digest streams for multimedia contents in accordance with an embodiment of the present invention;

FIG. 7 is a schematic block diagram of an apparatus for generating multiple levels of digest streams for multimedia contents in accordance with another embodiment of the present invention;

DETAILED DESCRIPTION OF THE PREFERRED EMBODIMENTS

In a content-based data area of a multimedia stream, generally, an appearance of an audio-visual object, occurrence information of each event, state information of audio-visual objects, events, backgrounds, scene information, shot information, segment information, etc. are described on a time axis. According to the present invention, the data structure of a multiple level digest segment information scheme for providing multiple levels of digest streams is described in the content-based data area thereof. The multiple level digest segment information scheme is constructed by a plurality of multiple level digest segment information structures, each of which is a data structure for describing digest segment in which a time range information of the digest segment is described and also a digest level information can be described. Moreover, in some cases, data for representing the running time of a digest stream or the total running time of digest segments of each digest level can be additionally described. A digest stream is comprised of digest segments. An importance level associated with each digest segment is used as a digest level for generating multiple levels of digest streams dynamically.

In addition, each digest segment information structure has a time range information of time continuous data, and the time range information can be represented by the start point and end point or the start point and duration of the digest segment.

Meanwhile, a digest segment is different from a shot, a scene and the like. Taking example by drama, generally, a digest stream is not constructed by connecting shots or scenes. Because the whole content can be analogized by browsing only parts of a shot or a scene in most cases, a digest stream is generally constructed by connecting some parts of shots or scenes. In a field such as sports, digest stream does not use entire shot or entire scene in order to construct a digest stream for the reason of the characteristics thereof.

In some cases, the digest segment corresponds to a shot or a scene, but, in most cases, it does not necessarily correspond to any of them. Therefore, in the present invention, the multiple level digest segment information scheme for providing multiple levels of digest streams by assigning an importance level to each digest segment, rather than by assigning an importance level to a shot or a scene, is proposed. Here, the digest segment is defined as a sequence of continuous frames, which is a general idea of covering shots or segments.

The construction of a digest stream in accordance with the present invention will now be described with reference to FIGS. 1 through 5.

Figure 1:
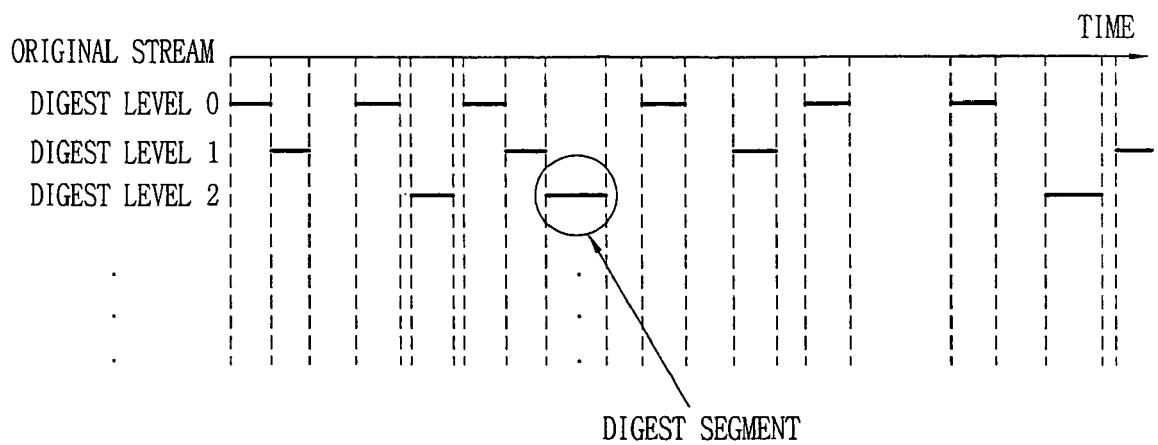
FIG. 1 shows an example of digest segments for a multimedia stream in accordance with an embodiment of the present invention.

FIG. 1 shows an example of digest segments for a multimedia stream in accordance with an embodiment of the present invention. As illustrated in FIG. 1, the horizontal axis represents the time axis, and the vertical axis denotes the digest level axis. It is shown that an original stream, which is a multimedia stream, is divided into a plurality of digest segments, which are divided into a plurality of digest levels. In the present invention, it is assumed that a first digest level '0' is the highest in priority, and a n-th digest level 'n-1' is the lowest.

Figure 2:
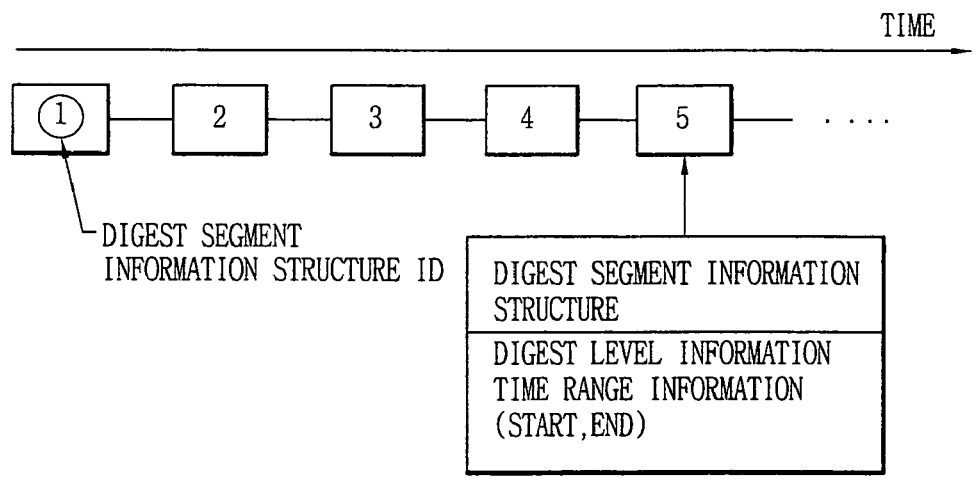
FIG. 2 shows the construction of a multiple level digest segment information scheme of a multimedia stream in accordance with an embodiment of the present invention.

FIG. 2 shows the construction of a multiple level digest segment information scheme of a multimedia stream in accordance with an embodiment of the present invention. A portion illustrated by a square is a digest segment information structure, and a number illustrated within the square is an ID of a digest segment information structure, which is stated only for the convenience of explanation. Digest segment structures can be sequentially arranged in a time sequence, each of which has its digest level and time range information(start point and end point or start point and duration).

Figure 3:
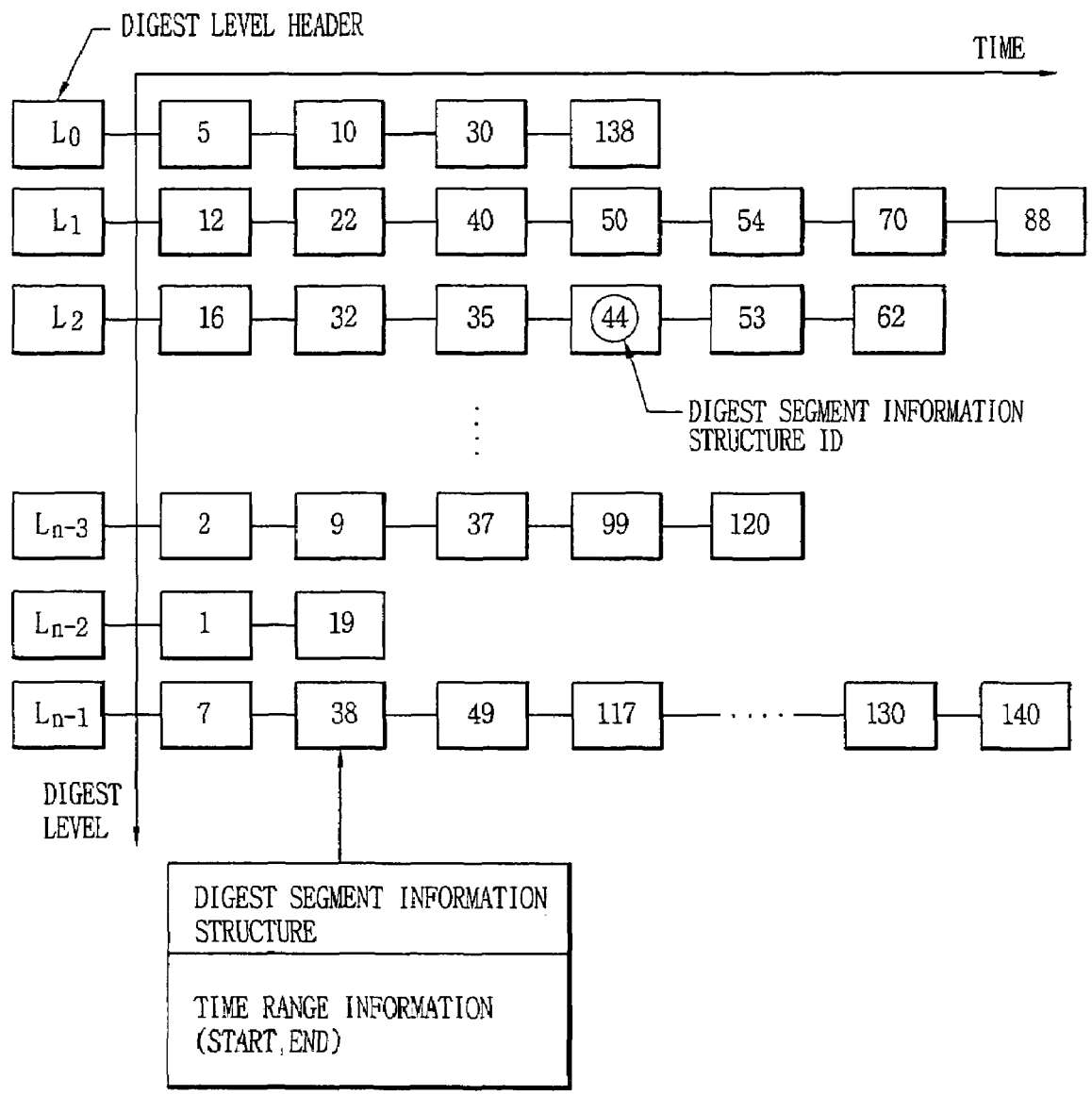
FIG. 3 shows the construction of a multiple level digest segment information scheme of a multimedia stream in accordance with another embodiment of the present invention.

FIG. 3 shows the construction of a multiple level digest segment information scheme for a multimedia stream different from that of FIG. 2. Digest level headers($L_0, L_1, \ldots, L_{n-1}$) are divided according to digest levels, and assuming that the number of digest levels is n, the number of digest level headers is n. For each digest level header($L_0, L_1, \ldots, L_{n-1}$), digest segment information structures of the corresponding digest level are arranged. For convenience, the digest segment information structures can be arranged in a time sequence. For instance, a first digest level header($L_0$) has digest segment information structures 5, 10, 30 and 138 arranged therein, and a second digest segment information structures 12, 22, 40, 50, 54, 70 and 88 arranged therein. In this manner, unlike the digest segment information structure in accordance with an embodiment of the present invention as shown in FIG. 2, the digest segment information structure in accordance with another embodiment of the present invention as shown in FIG. 3 has its time range information, and its digest level is described in its digest level header. Herein, information on the position of a first digest segment information structure among a plurality of digest segment information structures belonging to each digest level header may be needed. In this case, the information on the position can be contained in the digest level header or other area. Meanwhile, the presentation as illustrated in FIG. 2 and the presentation as illustrated in FIG. 3 are easily convertible to each other.

The method of obtaining multiple levels of digest streams from a multiple level digest segment information scheme for a multimedia content thus described will be illustrated below.

It is assumed that the number of digest levels for the original stream is n, and the number of digest segments for the original stream is m as described above. $S_j$ denotes the j-th digest segment information structure, $L(S_j)$ denotes the digest level of the digest segment information structure $S_j$, and $H_i$ denotes the digest stream whose digest level is i. The digest stream can be represented by a sequence of digest segment information structures, so that when a set of digest segments of the digest stream($H_i$) is denoted by $S(H_i)$, the set $S(H_i)$ is defined as follow:

$$S(H_i) = \{S_j | L(S_j) = 0,1,2,\ldots,i, (j=0,1,2,\ldots,m-1)\}$$

That is, each element of the set $S(H_i)$ is a digest segment information structure whose digest level is less than or equal to i. All the digest segment information structures contained in the set $S(H_i)$ can be sorted in a time sequence. According to the definition of the above set $S(H_i)$, the digest stream whose digest levels is k+1($H_{k+1}$) includes the digest stream whose digest level is k($H_k$).

Taking example by FIG. 3, the first digest stream($H_0$) is constructed by arranging digest segment information structures(S5, S10, S30 and S138) of digest level '0' in a time sequence, and the second digest stream($H_1$) is constructed by arranging the digest segment information structures(S5, S10, S30 and S138) digest level '0' and digest segment information structures(S12, S22, S40, S50, S54, S70 and S88) of digest level '1' in a time sequence. That is, the second digest stream ($H_1$) is constructed by arranging digest segment information structures(S5, S10, S12, S22, S30, S40, S50, S54, S70, S88 and S138) in a time sequence.

Figure 4:
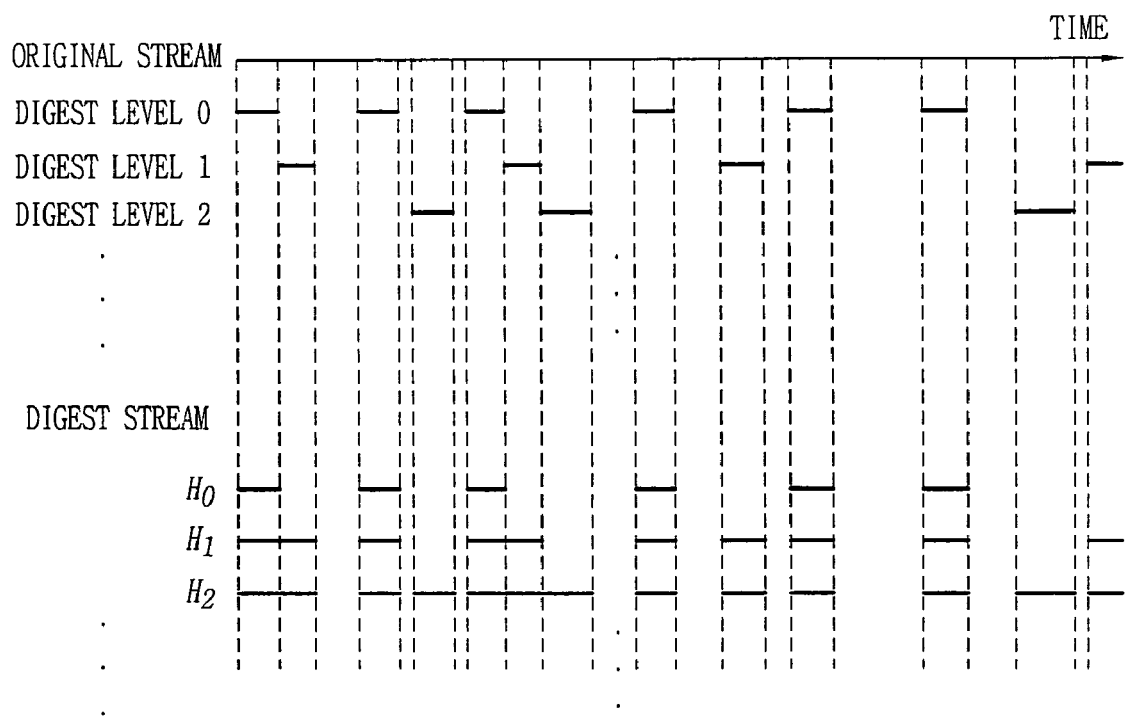
FIG. 4 shows an example of multiple level digest streams constructed by the multiple level digest segment information scheme.

FIG. 4 shows an example of multiple level digest streams constructed by the above-described method.

Next, the running time of each digest stream can be obtained based on the time range information contained in each of the plurality of digest segment information structures, which will be described below.

The total running time of the digest segment information structures belonging to a i-th digest level is the sum of the running time of each of digest segment information structures which belong to the i-th digest level.

That is, the running time $R(H_k)$ of the digest stream whose digest level is k($H_k$) can be represented by the sum of the running time of digest information structures whose digest level is less than or equal to k, can be expressed as follow:

$$R(H_k) = \sum_{i=0}^{i=k} R(Li)$$

Where $R(Li)$ denotes the sum of the running time of each digest segment information structure whose digest level is i.

Figure 5:
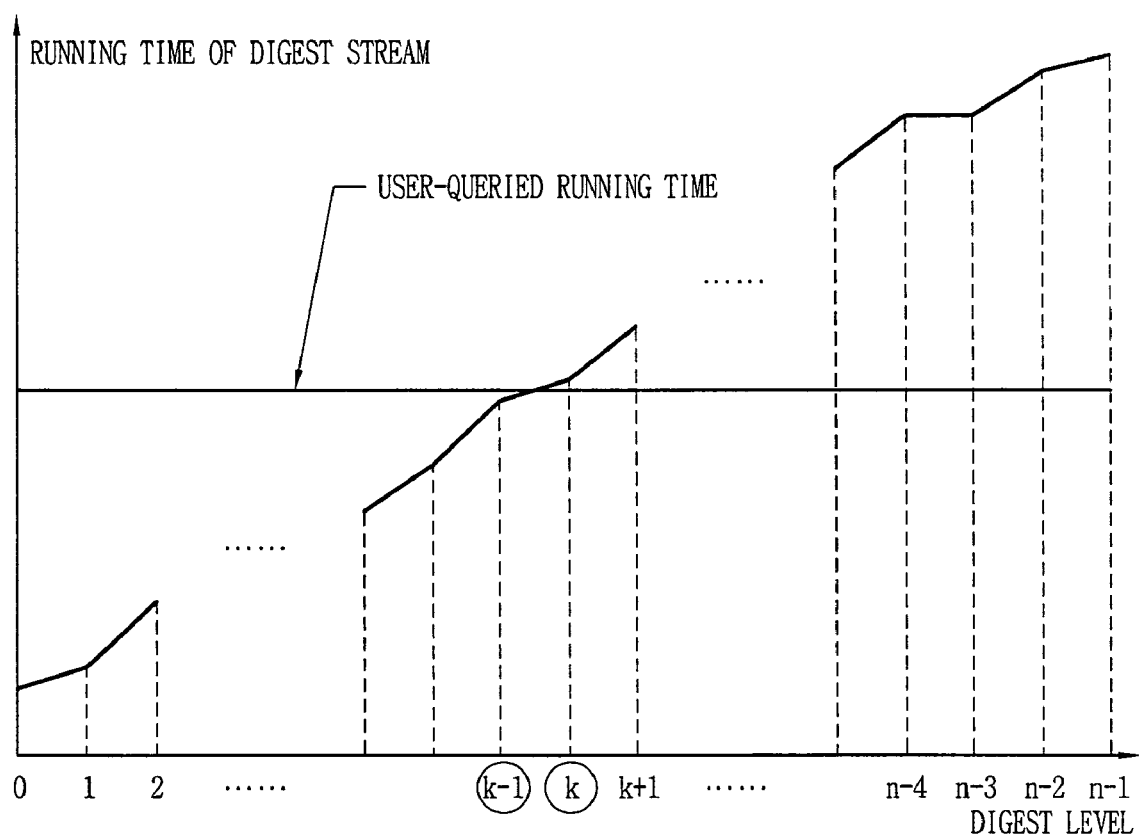
FIG. 5 is a graph showing the total running time of digest streams according to digest levels.

FIG. 5 is a graph showing the total running time of a digest streams according to digest levels. As illustrated therein, since the digest stream whose digest level is k+1 ($H_{k+1}$) includes the digest stream whose digest level is k($H_k$) the running time $R(H_{k+1})$ of the digest stream($H_{k+1}$) is longer than or equal to the running time $R(H_k)$ of the digest stream ($H_k$).

Next, the operation of providing a digest stream according to the query of the user will be described.

FIG. 6 is a schematic block diagram of an apparatus for generating multiple levels of digest streams for a multimedia content in accordance with an embodiment of the present invention. In the apparatus as illustrated in FIG. 6, when a plurality of running times is displayed, one of which is queried by the user, a digest stream corresponding to the queried running time is provided.

As illustrated in FIG. 6, the apparatus in accordance with an embodiment of the present invention includes a digest stream level determining unit 1 for determining and outputting the level of a digest stream corresponding to the running time queried by the user, upon receipt of a multimedia stream signal; a user input unit 2 for outputting the running time queried by the user to the digest stream level determining unit 1 by the operation of the user; a decoder 3 for outputting digest segments having a digest level by decoding based on the digest level which is inputted from the digest stream level determining unit 1, upon receipt of a multimedia stream signal; and a browsing/recording/editing unit 4 for sequentially browsing, recording, and editing the outputted digest segments.

The operation of the apparatus in accordance with an embodiment of the present invention thus described will now be described. Meanwhile, the operation of browsing, recording and editing performed by the browsing/recording/editing unit 4 is carried out by a well-known technique of the conventional art, and accordingly a detailed description thereof is omitted.

The digest stream level determining unit 1 includes a digest segment information scheme analyzing unit 11 and a digest stream information display unit 12. A content provider or a media file supplies the digest stream level determining unit 1 with a stream signal, and the digest stream level determining unit 1 determines a digest level of a user-selected digest stream. Herein, the multimedia stream signal includes a stream data and a content-based data for the stream, and the content-based data of the stream includes related multiple level digest segment information scheme.

The multiple level digest segment information scheme analyzing unit 11 computes the running time of each digest stream by analyzing the multiple level digest segment information scheme. The digest stream information display unit 12 displays the running time by computed digest streams to the outside.

When the user inputs a desired running time among the displayed running times, the running time is queried through the user input unit 2. The digest stream information display unit 12 determines a digest level of a digest stream corresponding to the queried running time, and outputs it to the decoder 3. The decoder 3 outputs digest segments with the digest level by decoding based on the digest level which is inputted from the digest stream level determining unit 1, upon receipt of a multimedia stream signal. The outputted digest segments are sequentially browsed, recorded, and edited by the browsing/recording/editing unit 4.

Taking example by FIG. 4, if the digest level queried by the user is "1", the decoder 3 outputs digest segments of digest level "0" or "1" from the multimedia stream signal by decoding.

In this manner, only the digest level of a digest stream is inputted to the decoder 3, and the decoder 3 selects digest segments from the multimedia stream signal based on the digest level and outputs them to the browsing/recording/editing unit 4.

FIG. 7 is a schematic block diagram of an apparatus for generating multiple levels of digest stream for a multimedia content in accordance with another embodiment of the present invention. The apparatus as shown in FIG. 7 provides a digest stream with a running time most close to the running time queried by the user. As illustrated in FIG. 7, the apparatus in accordance with another embodiment of the present invention includes a digest stream level determining unit 5, an user input unit 2, decoder 3, and a browsing/recording/editing unit 4. The digest stream level determining unit 5 includes a digest segment information scheme analyzing unit 11 and a digest level determining unit 51. Herein, the digest segment information scheme analyzing unit 11, decoder 3, and browsing/recording/editing unit 4 are identical with those illustrated in FIG. 6.

When the user inputs a desired running time by the user input unit 2, the digest level determining unit 51 outputs the digest level of a digest stream with a running time most close to the running time inputted by the user. That is, the digest level determining unit 51 compares the running time queried by the user with the running time of a digest stream of each multiple level digest stream, selects a running time $R(H_k)$ which is most close to the queried running time, and outputs a digest level(k) of the digest stream with the selected running time $R(H_k)$ to the decoder 3. In FIG. 5, the running time queried by the user is marked by a thick line. The running time corresponding to the digest level(k) is slightly longer than the queried running time, and the running time of a digest stream corresponding to a digest level(k−1) is slightly shorter than the queried running time.

The decoder 3 receives the multimedia stream signal, and outputs digest segments of a digest level lower than k or k−1, based on the digest level(k or k−1). The outputted digest segments are sequentially browsed, recorded and edited by the browsing/recording/editing unit 4.

Meanwhile, the embodiments of the present invention described above, in detail, the user input unit 2 as illustrated in FIGS. 6 and 7 is described by taking an operation of querying a running time of a digest stream for example, for the convenience of explanation. However, the user can queries other conditions besides a running time, the user input unit 2 can receive the conditions from the user, and the apparatus in accordance with the present invention provides a digest stream according to various conditions inputted by the user, which will be described below.

When the user inputs various conditions, for example, an occurrence of events, persons, backgrounds, objects, and some kinds of situation information, the digest stream level determining unit 5 constructs a digest stream based on the conditions, for example, occurrence of a events, appearance of persons, backgrounds, objects, and some kinds of situation information. The various conditions queried by the user are, for example, as follows:

Digest "Titanic" movie to 10 minutes focusing on "Leonardo Dicaprio".

Digest "Titanic" movie to 10 minutes focusing on sinking scene.

Digest a music to 100 seconds focusing on piano.

According to these queries from the user, the digest stream level determining unit 5 construct a digest stream based on a running time and various query conditions or filtering conditions. By lowering or raising the digest level of each digest segment, a digest stream is constructed. For instance, although a digest segment has a low digest level(with a digest level value close to n), the digest segment is considered as a digest segment with a little higher digest level for thereby constructing a digest stream if it corresponds to a query condition(e.g., "sinking scene"). Occurrence of events, appearance of persons, backgrounds, objects, and some kinds of situation information mentioned above are information generally contained in a content-based data area of a multimedia stream.

Meanwhile, there is a need for rapidly accessing only the running time information of a possible digest stream for the convenience of applications. For this purpose, a digest level running time information or a digest stream running time information can be added to a primary digest segment information scheme as shown in FIG. 2 or FIG. 3. Herein, the digest level running time information is information about the sum of the running times of digest segments of the same digest level is described according to digest levels, and the running time information of the digest stream is the running time information of a possible digest stream.

Such running time information can be described using an extra data structure, for example, in the case of a multiple level digest segment information scheme as shown in FIG. 2. In the case of a multiple level digest segment information scheme as shown in FIG. 3, the running time information can be described in each digest level header, or described using other data structure.

The above-described digest level running time information or digest stream running time information can be used for a rapid running time computation and for a parity check for a damaged data.

The parity check is possible by comparing the total running time of digest segments of the same digest level with the digest level running time of that digest level, and also by comparing the total running time of digest segments corresponding to a digest level lower than a particular digest level with the digest stream running time of that digest level. More specifically, if the total running time of the digest segments of the same digest level and the digest level running time of that digest level are equivalent each other, it is determined that there is no data damage, and if the two running times are different, it is determined that there is a data damage. In addition, the total running time of digest segments having a digest level lower than a particular digest level and the digest stream running time corresponding to that digest level are equivalent each other, it is determined that there is no data damage, and if the two running times are different, it is determined that there is a data damage.

Meanwhile, in the case that only the information about a possible digest is queried by a digest stream browser, the corresponding information can be displayed by accessing only the digest level running time information or the digest stream running time information. In the case that the user determines a digest level from the information, a digest stream can be generated by accessing only the actual digest segment.

In this way, the digest level running time information and digest stream running time information additionally described in the multiple level digest segment information can be utilized for a rapid digest stream information transmission and for a parity check for determining whether or not there is a data damage.

As described above in detail, in the present invention, a multiple level digest segment information scheme is stored in the content-based segment information scheme of an original stream, and an importance level(i.e., digest level) of a digest level information, a time range information, etc. is given to a digest segment of the multiple level digest segment information scheme, whereby the amount of storage for storing a digest stream is greatly decreased and it takes a very little time to encode each digest stream.

Moreover, by dynamically generating a digest stream using a digest segment information scheme during an execution of an application, it is unnecessary to edit a digest stream and encode an actual data so as to provide a multiple level digest stream. Therefore, it is possible to dynamically provide a digest stream corresponding to the dynamically changing level of user's need for a digest stream while the amount of data is not increased largely. Also, a user can browse a digest stream of a desired level for a desired time by using a multiple lo level digest stream provided.

In addition, although it is explained above that a digest stream of a multimedia stream is provided for an user in a multimedia server system, the user can also understand the overall story and/or the structure of a multimedia content and he or she can find and move to desired position fast by accessing the digest stream when he or she has a CD(compact disc) for the content.

What is claimed is:

1. A method implemented by an apparatus for processing multimedia content, the method comprising:

receiving an audio-visual content stream;

receiving segment information describing a plurality of digest segments in the audio-visual content stream, each digest segment representing a continuous temporal portion of the audio-visual content stream, the segment information being separate from the audio-visual content stream and defining each digest segment by a start time and a segment duration;

receiving digest segment group information describing alternative digest segment groups, the digest segment group information being separate from the audio-visual content stream and specifying that each alternative digest segment group includes two or more corresponding digest segments from the plurality of digest segments to represent a single stream of highlights concatenating non-contiguous and time ordered portions from the audio-visual content stream, wherein the digest segment group information specifies a respective highlight duration for each alternative digest segment group based on a sum of the segment durations of the corresponding digest segments in the group;

storing, in the apparatus, digest information that includes the segment information and the digest segment group information;

receiving user input indicating desired highlights from the audio-visual content stream, wherein the desired highlights have a desired duration; and based on the desired duration of the desired highlights indicated in the user input and based on the digest segment group information, generating a digest stream by concatenating non-contiguous and time ordered portions from the audio-visual content stream, wherein the digest stream corresponds to the single stream of highlights represented by one of the alternative digest segment groups.

2. The method of claim 1, wherein the digest segment group information specifies level information.

3. The method of claim 1, wherein the digest segment group information specifies a longer highlight duration for one of the alternative digest segment groups than for the other alternative digest segment groups, wherein the alternative digest segment group with the longer highlight duration provides a longer digest stream and a more extensive summary from the audio-visual content stream.

4. The method of claim 3, wherein the alternative digest segment group with the longer highlight duration includes all digest segments from another alternative digest segment group.

5. The method of claim 1, wherein generating the digest stream includes:

selecting a first digest segment group from the alternative digest segment groups based on the desired duration and the respective highlight duration for each alternative digest segment group.

6. The method of claim 1, wherein receiving segment information includes receiving at least a portion of the segment information along with the audio-visual content stream.

7. The method of claim 1, wherein receiving digest segment group information includes receiving at least a portion of the digest segment group information along with the audio-visual content stream.

8. The method of claim 1, wherein generating the digest stream includes recording the digest stream.

9. A computer program product, tangibly embodied in a machine readable storage medium, for processing multimedia content, the computer program comprising instructions to cause a data processing apparatus to perform operations comprising:

receiving an audio-visual content stream;

receiving segment information describing a plurality of digest segments in the audio-visual content stream, each digest segment representing a continuous temporal portion of the audio-visual content stream, the segment information being separate from the audio-visual content stream and defining each digest segment by a start time and a segment duration;

receiving digest segment group information describing alternative digest segment groups, the digest segment group information being separate from the audio-visual content stream and specifying that each digest segment group includes two or more corresponding digest segments from the plurality of digest segments to represent a single stream of highlights concatenating non-contiguous and time ordered portions from the audio-visual content stream, wherein the digest segment group information specifies a respective highlight duration for each alternative digest segment group based on a sum of the segment durations of the corresponding digest segments in the group;

storing, in the apparatus, digest information that includes the segment information and the digest segment group information;

receiving user input indicating desired highlights from the audio-visual content stream, wherein the desired highlights have a desired duration; and based on the desired duration of the desired highlights indicated in the user input and based on the digest segment group information, generating a digest stream by concatenating non-contiguous and time ordered portions from the audio-visual content stream, wherein the digest stream corresponds to the single stream of highlights represented by one of the alternative digest segment groups.

10. The computer program product of claim 9, wherein the digest segment group information specifies level information.

11. The computer program product of claim 9, wherein the digest segment group information specifies a longer highlight duration for one of the alternative digest segment groups than for the other alternative digest segment groups, wherein the alternative digest segment group with the longer highlight duration provides a longer digest stream and a more extensive summary from the audio-visual content stream.

12. The computer program product of claim 11, wherein the alternative digest segment group with the longer highlight duration includes all digest segments from another alternative digest segment group.

13. The computer program product of claim 9, wherein generating the digest stream includes:

selecting a first digest segment group from the alternative digest segment groups based on the desired duration and the respective highlight duration for each alternative digest segment group.

14. An apparatus for processing multimedia content, the apparatus comprising:
   a media stream processing unit to receive and process an audio-visual content stream;
   a user input unit to receive user input indicating desired highlights from the audio-visual content stream, wherein the desired highlights have a desired duration;
   a data storage; and
   a digest stream processing unit configured to:
   (i) receive segment information describing a plurality of digest segments in the audio-visual content stream, each digest segment representing a continuous temporal portion of the audio-visual content stream, the segment information being separate from the audio-visual content stream and defining each digest segment by a start time and a segment duration;
   (ii) receive digest segment group information describing alternative digest segment groups, the digest segment group information being separate from the audio-visual content stream and specifying that each alternative digest segment group includes two or more corresponding digest segments from the plurality of digest segments to represent a single stream of highlights concatenating non-contiguous and time ordered portions from the audio-visual content stream, wherein the digest segment group information specifies a respective highlight duration for each alternative digest segment group based on a sum of the segment durations of the corresponding digest segments in the group;
   (iv) store, in the data storage, digest information that includes the segment information and the digest segment group information; and
   (v) generate, based on the desired duration of the desired highlights indicated in the user input and based on the digest segment group information, a digest stream by concatenating non-contiguous and time ordered portions from the audio-visual content stream, wherein the digest stream corresponds to the single stream of highlights represented by one of the alternative digest segment groups.

15. The apparatus of claim 14, wherein the digest segment group information specifies level information.

16. The apparatus of claim 14, wherein the digest segment group information specifies a longer highlight duration for one of the alternative digest segment groups than for the other alternative digest segment groups, wherein the alternative digest segment group with the longer highlight duration provides a longer digest stream and a more extensive summary from the audio-visual content stream.

17. The apparatus of claim 16, wherein the alternative digest segment group with the longer highlight duration includes all digest segments from another alternative digest segment group.

18. The apparatus of claim 14, wherein the digest stream processing unit is configured to select a first digest segment group from the alternative digest segment groups based on the desired duration and the respective highlight duration for each alternative digest segment group.

* * * * *